(12) United States Patent
Masuya et al.

(10) Patent No.: US 7,742,836 B2
(45) Date of Patent: Jun. 22, 2010

(54) CONTROL UNIT

(75) Inventors: Michi Masuya, Yamanashi (JP); Hideki Oka, Yamanashi (JP); Masamoto Fukuda, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 135 days.

(21) Appl. No.: 12/007,098

(22) Filed: Jan. 7, 2008

(65) Prior Publication Data

US 2008/0177403 A1 Jul. 24, 2008

(30) Foreign Application Priority Data

Jan. 18, 2007 (JP) ............................. 2007-009298

(51) Int. Cl.
G06F 19/00 (2006.01)
G06F 17/40 (2006.01)
G05B 11/01 (2006.01)
G05B 19/18 (2006.01)
G05B 9/02 (2006.01)
G01F 17/00 (2006.01)

(52) U.S. Cl. .......................... 700/174; 700/16; 700/61; 700/64; 700/79; 700/80; 700/178; 700/255; 02/56; 02/182; 02/187

(58) Field of Classification Search .................. 700/13, 700/16, 61, 64, 79, 80, 108, 174, 177, 178, 700/255; 702/56, 182, 183, 187

See application file for complete search history.

(56) References Cited

U.S. PATENT DOCUMENTS 6,298,282 B1   10/2001   Guldi et al.
6,343,242 B1   1/2002    Nomura et al.
6,975,919 B2 * 12/2005   Kluft ........................... 700/177
2006/0101897 A1 5/2006   Masuya et al.

FOREIGN PATENT DOCUMENTS

| CN | 1773227 A | 5/2006 |
| EP | 1 424 173 A2 | 11/2003 |
| EP | 1 518 648 A2 | 9/2004 |
| JP | 2-179479 | 7/1990 |
| JP | 9091014 (A) | 4/1997 |
| JP | 2006-138756 | 6/2006 |

OTHER PUBLICATIONS

Japanese Notice of Reasons for Rejection mailed Nov. 11, 2008 issued in Japanese Application No. 2007-009298 (including a partial translation thereof).
European Search Report mailed Apr. 9, 2008 issued in European Application No. 07 02 3979.3.
Chinese Notification of First Office Action issued Jul. 26, 2009 issued in Chinese Application No. 200810001381X (including English Translation).

* cited by examiner

*Primary Examiner*—Sean P Shechtman
(74) *Attorney, Agent, or Firm*—Drinker Biddle & Reath LLP

(57) ABSTRACT

A control unit for a machine tool at least one vibration detection device attached to a main shaft portion of a machine tool or a movable body; a storage device for storing a vibration signal detected by the vibration detection device being related to operation information of the machine tool; a collision judgment device for judging that a collision has occurred; and an output device for outputting the vibration signal at the time of judging the occurring of the collision. By the above constitution, the control unit is capable of grasping a specific circumstance of collision and quickly determining a cause of collision.

2 Claims, 4 Drawing Sheets

Fig.2

| DATE AND TIME INFORMATION | OPERATION INFORMATION | POSITION INFORMATION | SPEED INFORMATION | VIBRATION INFORMATION X1 | VIBRATION INFORMATION X2 | VIBRATION INFORMATION X3 | ... |
|---|---|---|---|---|---|---|---|
| T1 | A1 | B1 | C1 | X11 | X21 | X31 | ... |
| T2 | A2 | B2 | C2 | X12 | X22 | X32 | ... |
| T3 | A3 | B3 | C3 | X13 | X23 | X33 | ... |
| ... | ... | ... | ... | ... | ... | ... | ... |

CONTROL UNIT

BACKGROUND OF THE INVENTION

1. Field of the Invention

The present invention relates to a control unit. More specifically, the present invention relates to a control unit having a collision judgment function for judging that a main shaft of a machine tool has collided with other objects.

2. Description of the Related Art

A main shaft of a machine tool or an arm of a robot may unexpectedly collide with other objects due to a program error or an error in operation made by an operator in some cases. In the case of a collision, the main shaft or the robot arm, and a motor for driving the main shaft or the robot arm may be damaged. In this case, machining and operation accuracy are affected. Therefore, when a collision occurs, it is desirable that the machine tool or the robot be stopped and checked.

According to Japanese Unexamined Patent Publication No. 2-179479, the following countermeasure is disclosed. Since the main shaft and the motor to drive the main shaft are abnormally vibrated when the main shaft of the machine tool etc., is damaged, an abnormal vibration is detected by a position detector provided on the main shaft. Further, according to Japanese Unexamined Patent Publication No. 2006-138756, the following countermeasure is disclosed. In the case where a maximum value of an output signal sent from a vibration sensor attached to a main shaft etc., of a machine tool exceeds a threshold value, it is judged that a collision of the main shaft with other objects has occurred.

In Japanese Unexamined Patent Publication No. 2-179479 and Japanese Unexamined Patent Publication No. 2006-138756, it is possible to detect a collision without being linked with a control unit for a machine tool. In other words, in Japanese Unexamined Patent Publication No. 2-179479 and Japanese Unexamined Patent Publication No. 2006-138756, an output signal of a vibration sensor at the time of the occurrence of a collision is not related to the operation information of the machine tool, for example, the operation program.

However, in the case where the machine tool is automatically operated, specific circumstances at the time of collision are unknown. Therefore, it is difficult to determine a cause of the collision. Even when the machine tool is manually operated by an operator, unless the operator reports that the collision has occurred, it is also difficult to determine the cause of the collision, since the specific circumstances at the time of collision are unknown.

The present invention has been accomplished in the light of the above circumstances. An object of the present invention is to provide a control unit capable of knowing a specific circumstance of collision occurred in a machine tool and quickly determining the cause of the collision.

SUMMARY OF THE INVENTION

In order to accomplish the object described above, the first aspect provides a control unit comprising: at least one vibration detection means attached to a main shaft portion of a machine tool or a movable body relatively moving with respect to the main shaft portion; a storage means for storing a vibration signal detected by the vibration detection means being related to operation information of the machine tool; a collision judgment means for judging that a collision has occurred in the case where the vibration signal stored in the storage means exceeds a previously determined threshold value when comprising the vibration signal with the threshold value and an output means for outputting the vibration signal at the time of judging the occurrence of the collision and also outputting the operation information stored in the storage means related to the vibration signal in the case where the collision judgment means judges that the collision has occurred.

In other words, in the first aspect, the vibration signal of the main shaft portion, etc., and the operation information of the machine tool are stored being related to each other. Accordingly, the vibration signal and the operation information at the time of collision can be outputted together. Accordingly, a specific circumstance of the output shaft of the machine tool at the time of collision can be known. Therefore, a cause of the collision can be quickly determined.

According to the second aspect, a control unit in the first embodiment further comprises: a position and speed detection means for detecting at least one of the position and the speed of the main shaft portion of the machine tool or the movable body relatively moving with respect to the main shaft portion, wherein when it is judged that the collision has occurred, the storage means stores at least one of the position information and the speed information detected by the position and speed detection means and the output means outputs at least one of the position information and the speed information together with the vibration signal and the operation information.

In other words, in the second aspect, the positional information and/or the speed information of the main shaft portion or the movable body at the time of collision can be also acquired. Therefore, the cause of the collision can be more accurately determined.

According to the third aspect, as in the first embodiment, the control unit has a function of measuring the date and time information, and when it is judged that the collision has occurred, the storage means stores the information of the date and time when it is judged that the collision has occurred and the output means outputs the date and time information together with the vibration signal and the operation information.

In other words, in the third aspect, the date and time at which a collision has occurred are grasped. Therefore, a cause of the collision can be more accurately determined.

According to the fourth aspect, as in the first embodiment, the main shaft portion of the machine tool or the movable body which moves relative to the main shaft portion is capable of moving in triaxial moving directions making a right angle with each other, at least three vibration detection means can respectively detect vibrations in each of the triaxial moving directions, and when the main shaft portion of the machine tool or the movable body which moves relative to the main shaft portion is moved in one or two triaxial moving directions, the collision judgment means judges that a collision has occurred in the case where a difference between vibration signals detected by one or two of the vibration detection means in one or two moving directions and a vibration signal detected by the remaining vibration detection means in the remaining moving direction exceeds a predetermined threshold value.

In other words, in the fourth aspect, the actual moving direction of the main shaft portion etc., can be known from the operation information. Therefore, for example, even in the case of a disturbance, it is possible to make a collision judgment without being affected by the disturbance.

According to the fifth aspect, as in the first embodiment, a control unit further comprises an input portion used for adjusting the threshold value.

In other words, in the fifth aspect, the most appropriate threshold value can be set in accordance with the operation information of the machine tool or the type of workpiece machined by the machine tool.

According to the sixth aspect, as in the first embodiment, the operation information relates to a movement of the main shaft portion or the movable body in the automatic operation program of the machine tool.

In other words, in the sixth aspect, the operation information of the machine tool can be relatively easily acquired.

From the detailed explanations of the typical embodiment of the present invention shown in the accompanying drawings, the objects, characteristics and advantages of the present invention will be clearified.

BRIEF DESCRIPTION OF THE DRAWINGS

FIG. 2 is a view showing information stored in a storage portion of the control unit illustrated in FIG. 1.

DETAILED DESCRIPTION

Figure 1:
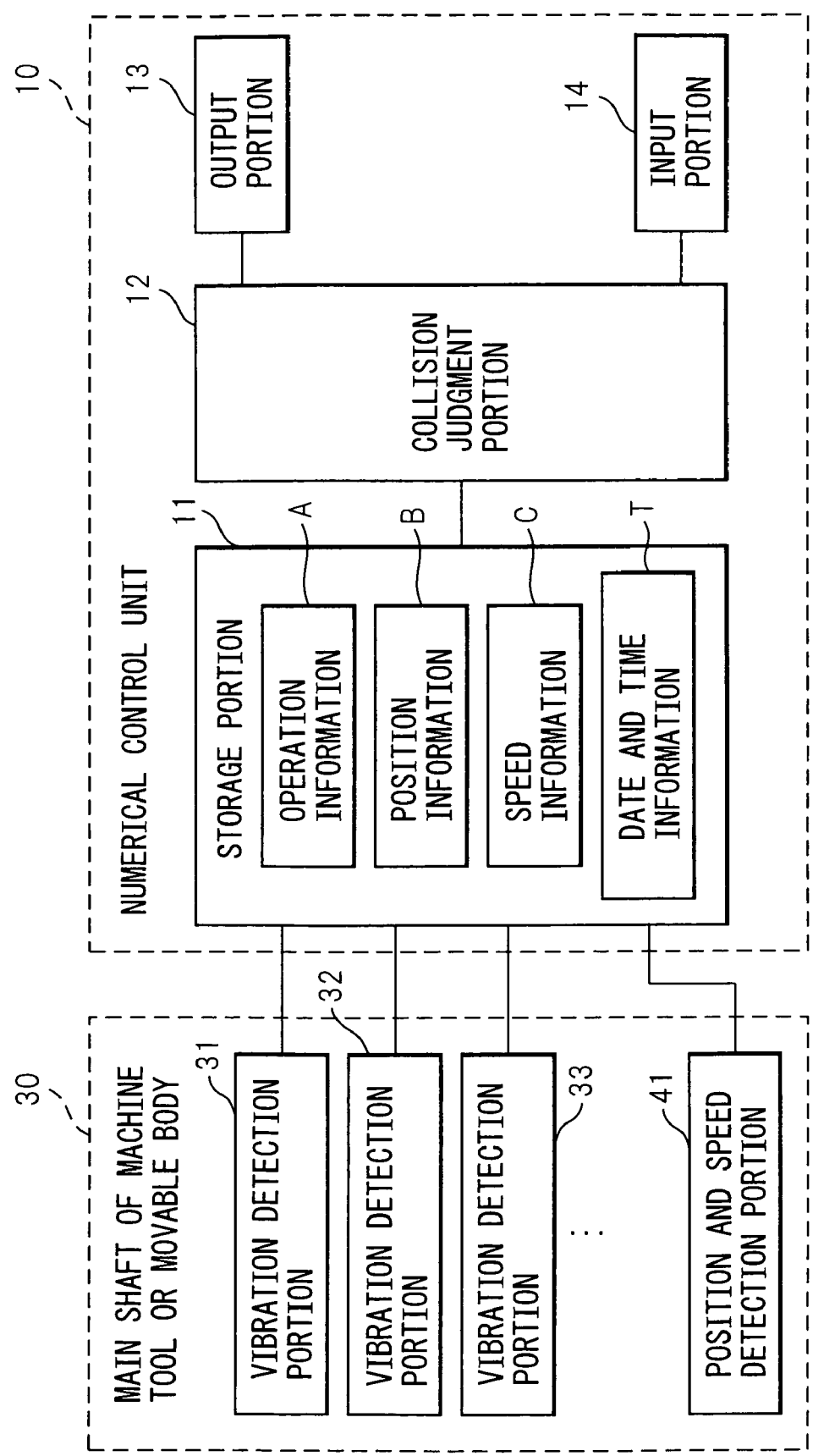
FIG. 1 is an arrangement view showing a control unit of the present invention.

Referring to the accompanying drawings, an embodiment of the present invention will be explained below. In the following drawings, like reference numerals have been used throughout to designate similar elements. In order to facilitate understanding, various reduced scales are used in the drawings.

FIG. 1 is an arrangement view showing a control unit of the present invention. A main shaft 30 of a machine tool 30 or a robot arm is connected to a control unit, for example, a numerical control unit 10 shown in FIG. 1. Numerical control unit 10 may be connected to a movable body which moves relative to the main shaft of the machine tool, for example, numerical control unit 10 may be connected to a table (not shown) for holding a workpiece. In this specification, "the main shaft 30 or others" used in the following description means two cases. One is a case in which numerical control unit 10 is connected to main shaft 30 and the other is a case in which numerical control unit 10 is connected to movable body.

Numerical control unit 10 is composed of a digital computer. As shown in FIG. 1, the numerical control unit 10 includes: a storage portion 11 having ROM and RAM; a collision judgment portion 12 which can be a processor; an output portion 13 which can be a display, a printer or an electronic data taking-out portion such as a memory card slot, etc.; and an input portion 14 which can be a keyboard or a mouse, etc. As shown in the drawing, the storage portion 11, the collision judgment portion 12, the output portion 13 and the input portion 14 are connected to each other by a bidirectional bus.

As can be seen from FIG. 1, when the numerical control unit 10 is operated, the operation information A, the positional information B for the main shaft and the speed information C for the machine tool, which will be described later, are stored in the storage portion 11. The numerical control unit 10 also has a function of recording a date and time. If required, the date and time information T is stored in the storage portion 11. Due to the foregoing, it is possible to know what time a collision occurred. Therefore, the date and time information T can be utilized for analyzing a cause of the collision.

In this connection, although not shown in FIG. 1, the operation program of the machine tool, the collision judgment program described later and the threshold values L1, L2 used in the collision judgment program are also stored in the storage portion 11. The threshold values L1, L2 can be appropriately adjusted by an operator by using the input portion 14 of the numerical control unit 10. Accordingly, the most appropriate threshold values L1, L2 can be set in accordance with the operation information for the machine tool and the type of a workpiece to be machined by the machine tool. Therefore, it is possible to make a highly accurate collision judgment as described later.

At least one vibration detection portion 31 to 33 is attached to the main shaft 30 or others of the machine tool. In the example shown in the drawing, three vibration detection portions 31 to 33 are attached to the main shaft 30 or others so that vibrations in triaxial moving directions, which make a right angle with each other, can be detected. Each vibration detection portion 31 to 33 converts the vibration of an attached object into voltage and then the voltage is further converted into a digital signal and outputted. An example of this type vibration detection portion is thereof a vibration pickup. Since the vibration pickup is well known, a detailed explanation thereof is omitted. As can be seen from FIG. 1, these vibration detection portions 31 to 33 are connected to the storage portion 11 of the numerical control unit 10.

Further, as shown in the drawing, the main shaft 30 or others is provided with a position and speed detection portion 41 for detecting a position and speed of the main shaft 30 or a movable body related to the main shaft 30. This position and speed detection portion 41 is connected to the storage portion 11 of the numerical control unit 10 in the same manner. A position and speed of the main shaft or others detected by the position and speed detection portion 41 are stored in the storage portion 11 as positional information B and speed information C.

FIG. 2 is a view showing information stored in the storage portion of the control unit illustrated in FIG. 1. Referring to FIGS. 1 and 2, a storing operation executed to the storage portion 11 of the numerical control unit 10 according to the present invention will be explained below. After the machine tool has been set and a workpiece has been held on a table, the machine tool is set in motion according to a selected operation program.

When the machine tool is operated, as shown in FIG. 2, the vibration signals X1 to X3 sent from the vibration detection portions 31 to 33 are stored in the storage portion 11, respectively. Since the numerical control unit 10 has a function of measuring a date and time as described before, the vibration signals X1 to X3 for each predetermined period of time are stored in order in the storage portion in the form of a map while the vibration signals X1 to X3 are being made to correspond to the date and time information T at the time of detection made by the vibration detection portions 31 to 33.

The date and time information T0, at which the operation program of the machine tool started, can be known by the time measuring function of the numerical control unit 10. Accordingly, information relating to the movement of the main shaft 30, etc. within the time T–T0 after the start of the operation program can be grasped from the contents of the operation program. Specifically, pieces of information relating to the movement of the main shaft 30 or others are a position, speed and direction. The pieces of information are stored in order as operation information in the form of a map in the same manner while the pieces of information are being made to correspond to the date and time information T.

Generally, a leading edge of a wave-form of vibration, which is generated at the time of collision of one object with another object, is sharp. Therefore, it is desirable that time intervals, at which pieces of operation information are stored in the storage portion 11 in order, are reduced as much as possible. Recently, an operation speed of machine tools have increased remarkably. Therefore, in order to store the operation information of the machine tool in detail, it is preferable that the time intervals, at which the pieces of information are stored in the storage portion, are as small as possible.

On the other hand, in the case where the time intervals are relatively small, the storage capacity of the storage portion 11 is increased. Therefore, it is desirable that the vibration signals X1 to X3 and the operation information A are stored only in one or a plurality of predetermined time zones from the start of the operation program.

As shown in the drawing, it is advantageous that the actual position information B and the actual speed information C of the main shaft 30 or others, which are detected by the position and speed detection portion 41, are stored in the storage portion in order in the same manner while the actual position information B and the actual speed information C of the main shaft 30 or others are being made to correspond to the date and time information T. Due to the foregoing, a position information and a speed information of the main shaft 30 can be acquired at the moment when it is judged that a collision has occurred. Accordingly, it is possible to more accurately determine a cause of the collision. In the case where the machine tool is manually operated, no operation program exists. Therefore, operation information A cannot be acquired. In this case, it is especially advantageous to store the actual position information B and the actual speed information C of the main shaft 30.

Figure 3:
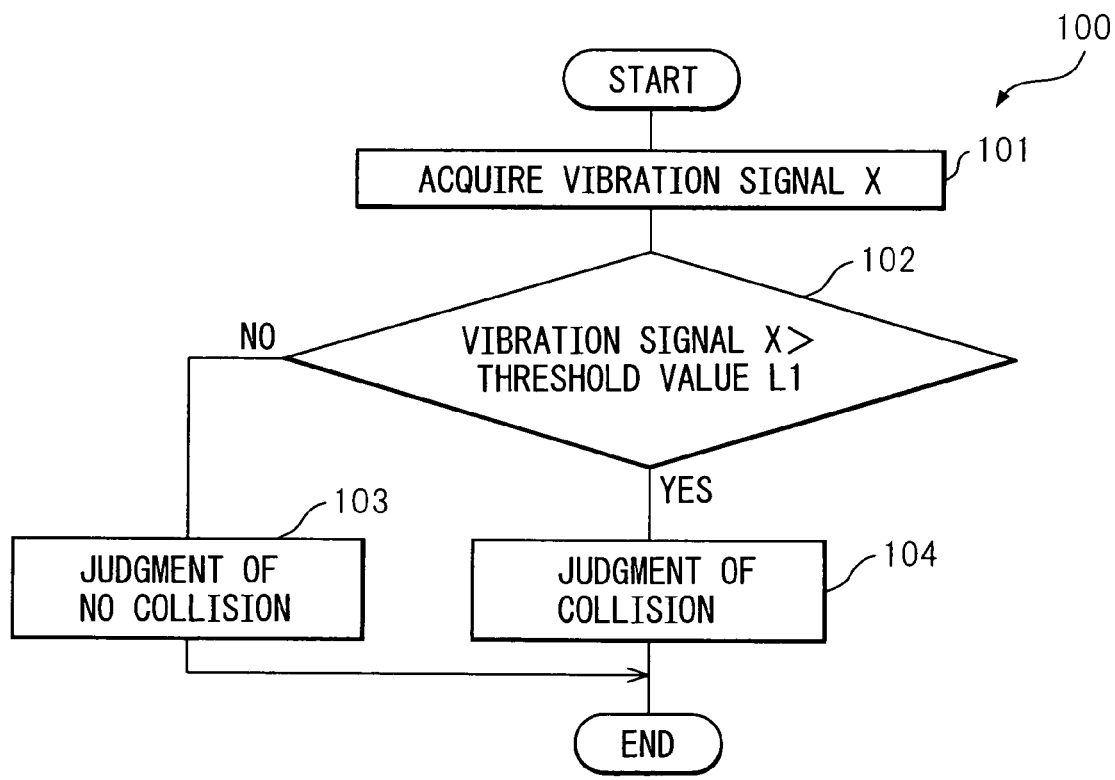
FIG. 3 is a first flow chart in the case of a collision judgment made in a collision judgment portion of the control unit of the present invention.

In the present invention, whether or not the main shaft 30 or others collide with another object is judged by the collision judgment portion 12 of the numerical control unit 10. FIG. 3 is a first flow chart at the time of a collision judgment made by the collision judgment portion of the control unit. In step 101 of the collision judgment program shown in FIG. 3, the vibration signal X stored in the storage portion 11 by the date and time information T is acquired, i.e., one of the vibration signals X1 to X3 is acquired.

Next, in step 102, this vibration signal X is compared with a predetermined threshold value L1. In the case where the vibration signal X is higher than the threshold value L1, the program proceeds to step 104 and it is judged that a collision has occurred. On the other hand, in the case where the vibration signal X is not higher than the threshold value L1, it is judged that a collision has not occurred (step 103).

In the case where it is judged that a collision has occurred, the vibration signal X, which has been judged to be the occurrence of the collision, of the date and time information T and the operation information A which are corresponding to the vibration signal X are outputted through the output portion 13. In other words, these pieces of information are displayed on the output portion 13 as a display unit. Alternatively, these pieces of information are printed by the output portion 13 as a printer. Alternatively, these pieces of information are taken outside by the output portion 13 which is an electronic data taking-out portion such as a memory card slot.

As described above, in the present invention, the vibration signal X for the main shaft 30 or others and the operation information A of the machine tool are stored as related to each other. Therefore, the vibration signal X and the operation information A at the time of a collision are made to correspond to each other and outputted together. Therefore, the operator can grasp a specific circumstance of the output shaft of the machine tool at the time of the collision from the output contents and quickly elucidate a cause of the collision.

Figure 4:
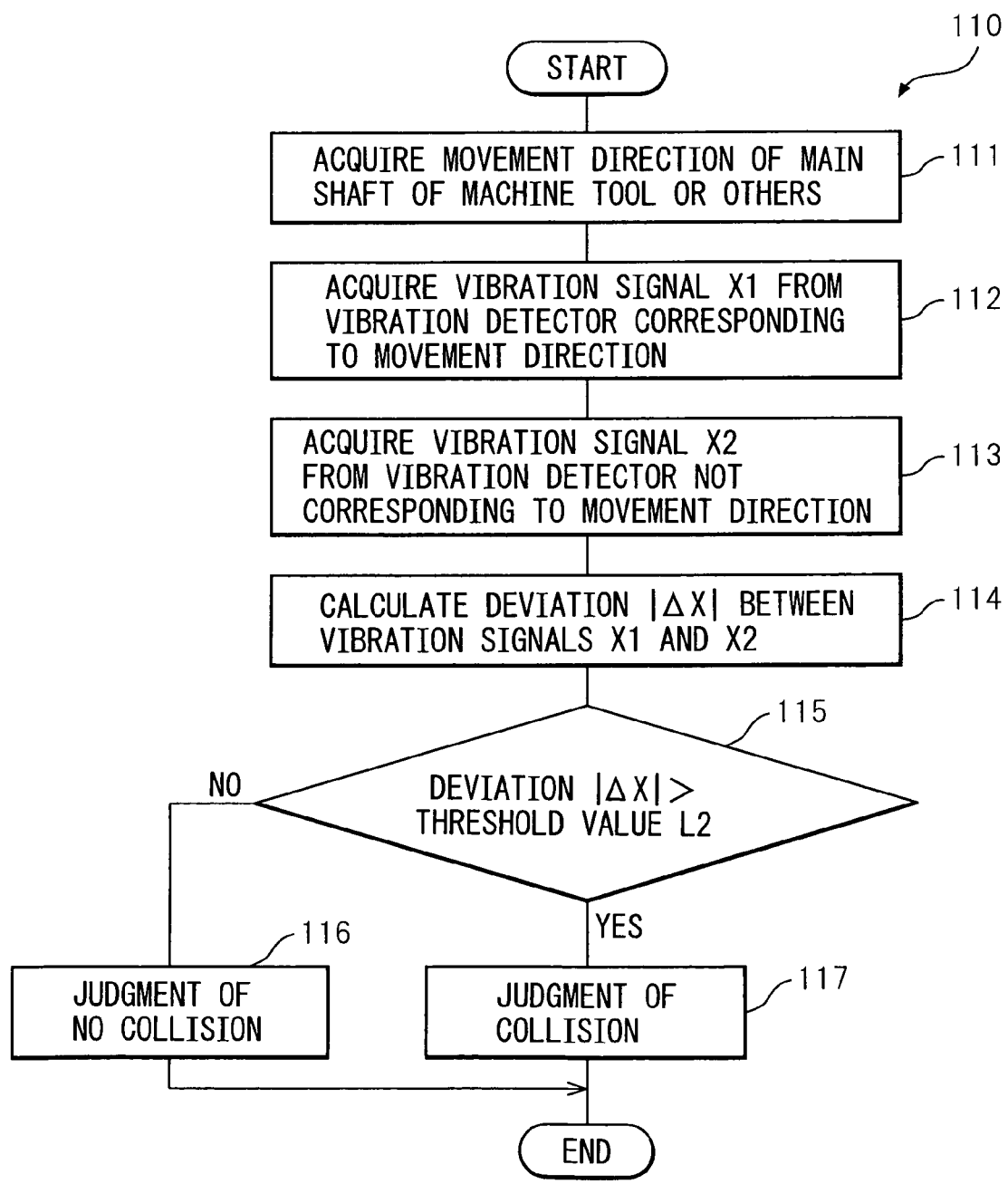
FIG. 4 is a second flow chart in the case of a collision judgment made in the collision judgment portion of the control unit of the present invention.

Further, since the main shaft 30 or others of the machine tool and the numerical control unit 10 are connected to each other in the present invention, it is also possible to make a collision judgment by another method shown in FIG. 4. In other words, in step 111 of the collision judgment program 110 shown in FIG. 4, a movement direction of the main shaft 30 or others at the time of one date and time information T.

Since the operation information A corresponding to the date and time information T is stored in the storage portion 11 as described before, the collision judgment portion 12 acquires a movement direction of the main shaft 30 or others on the basis of this operation information A. In this case, a direction which can be detected by the vibration detection portion 31 is a movement direction of the main shaft 30 or others.

Then, in step 112, the vibration signal X1 of the vibration detection portion 31 corresponding to the movement direction is acquired. Further, in step 113, the vibration signal X2 of the vibration detection portion not corresponding to the above movement direction is acquired, for example, the vibration signal X2 of the vibration detection portion 32 is acquired. Then, after an absolute value $|\Delta X|$ of the deviation between the vibration signals X1 and X2 has been calculated (step 114), it is judged whether or not this deviation $|\Delta X|$ is higher than the predetermined threshold value L2 (step 115).

In the case where the deviation $|\Delta X|$ is higher than the threshold value L2, the program proceeds to step 117 and it is judged that a collision has occurred. On the other hand, in the case where the deviation $|\Delta X|$ is not higher than the threshold value L2, it is judged that no collision has occurred (step 116). After that, in the same manner as that the described before, the vibration signal X, which has been judged to be the occurrence of the collision, the operation information A and the date and time information T are outputted while they are made to correspond to each other.

It is clear that the same effect can be obtained even in the case where the collision judgment is made as described above. In the embodiment shown in FIG. 4, a movement direction of the main shaft 30 or others is judged on the basis of the operation information A. Therefore, for example, even in the case of disturbance, it is possible to make a collision judgment in a direction, in which an estimated collision may occur, on the basis of the operation information A. Accordingly, in the present invention, the movement direction can be decided without being affected by the disturbance and the collision judgment can be accurately made.

In this connection, in the embodiment shown in FIG. 4, in the case where not only the direction related to the vibration detection portion 32 but also the direction related to the vibration detection portion 33 does not agree with the movement direction of the main shaft 30 or others, the deviation $|\Delta X|$ between the vibration signals X1 and X3 may be further compared with the threshold value L2.

In the case where the main shaft 30 or others move in two directions, for example, the main shaft 30 or others move in directions related to the vibration detection portions 31 and 32, the deviation $|\Delta X|$ between the vibration signals X1 and X3 and the deviation $|\Delta X|$ between the vibration signals X2 and X3 may be respectively compared with the threshold value L2. It is clear that even the above case is included in the scope of the present invention.

The present invention has been explained above referring to the typical embodiment. However, it can be understood that variations, modifications, omissions and additions can be made by those skilled in the art without departing from the scope of the present invention.

The invention claimed is:

1. A control unit comprising:
   at least one vibration detection arrangement attached to one of a main shaft portion and or a movable body of a machine tool, the movable body relatively moves with respect to the main shaft portion;
   a position and speed detection arrangement for detecting at least one of the position and the speed of one of the main shaft portion and the movable body; wherein the control unit has a function of recording a date and time information;
   a storage arrangement for storing a vibration signal detected by the vibration detection arrangement, the at least one of the position information and the speed information detected by the position and speed detection arrangement, operation information of the machine tool, and the date and time information recorded by the control unit; wherein the vibration signal, the at least one of the position information and the speed information and the operation information are stored while being made to correspond to the date and time information;
   a collision judgment arrangement for judging that a collision occurred by determining whether the vibration signal stored in the storage arrangement exceeds a previously determined threshold value; and
   an output arrangement for outputting the vibration signal at the time of judging the occurring of the collision, and also outputting the at least one of the position information and the speed information, the operation information, and the date and time information, which are stored in the storage arrangement and correspond to the vibration signal at the time of judging the occurring of the collision;
   wherein the main shaft portion of the machine tool or the movable body moving relative to the main shaft portion is capable of moving in the triaxial moving directions making a right angle with each other, at least three vibration detection arrangement can respectively detect vibrations in each of the triaxial moving directions, and when the main shaft portion of the machine tool or the movable body relatively moving with respect to the main shaft portion is moved in one or two of the triaxial moving directions, the collision judgment arrangement judges that a collision occurred by determining whether a difference between vibration signals detected by one or two of the vibration detection arrangement in one or two of the moving directions and a vibration signal detected by the remaining vibration detection arrangement in the remaining moving direction exceeds a predetermined threshold value.

2. A control unit according to claim 1, wherein the operation information relates to a movement of the main shaft portion or the movable body in the automatic operation program of the machine tool.

* * * * *